US012627479B2

(12) United States Patent

Hirashita

(10) Patent No.: US 12,627,479 B2
(45) Date of Patent: May 12, 2026

(54) RECEPTION APPARATUS, TRANSMISSION APPARATUS, QUANTUM KEY DISTRIBUTION SYSTEM, AND PEAK POSITION DETECTION METHOD

(71) Applicant: NEC Corporation, Tokyo (JP)

(72) Inventor: Shinya Hirashita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 18/423,425

(22) Filed: Jan. 26, 2024

(65) Prior Publication Data

US 2024/0259193 A1 Aug. 1, 2024

(30) Foreign Application Priority Data

Feb. 1, 2023 (JP) ................................ 2023-013927

(51) Int. Cl.
H04L 9/08 (2006.01)

(52) U.S. Cl.
CPC .................................. H04L 9/0852 (2013.01)

(58) Field of Classification Search
CPC ............................ H04L 9/0852; H04L 9/0858
See application file for complete search history.

(56) References Cited

FOREIGN PATENT DOCUMENTS

JP 2000-101570 A 4/2000

OTHER PUBLICATIONS

JP20000101570. Machine Translation of JP20000101570 (Year: 2000).*

* cited by examiner

*Primary Examiner* — Brian F Shaw
(74) *Attorney, Agent, or Firm* — Sughrue Mion, P.LLC.

(57) ABSTRACT

The present disclosure includes a reception apparatus performing homodyne detection of a first beam transmitted from a transmission apparatus by using a second beam transmitted from the transmission apparatus and having an optical intensity higher than the first beam, and detecting a peak position, which is a timing at which there is a local maximum or a local minimum in an amplitude of a signal obtained by the homodyne detection.

7 Claims, 7 Drawing Sheets

RECEPTION APPARATUS, TRANSMISSION APPARATUS, QUANTUM KEY DISTRIBUTION SYSTEM, AND PEAK POSITION DETECTION METHOD

CROSS-REFERENCE TO RELATED APPLICATIONS

This application is based upon and claims the benefit of priority from Japanese patent application No. 2023-013927, filed on Feb. 1, 2023, the disclosure of which is incorporated herein in its entirety by reference.

TECHNICAL FIELD

The present disclosure relates to a reception apparatus, a transmission apparatus, a quantum key distribution system, and a peak position detection method.

BACKGROUND ART

As one method for distributing encryption keys, continuous variable quantum key distribution is known (see, for example, Japanese Unexamined Patent Application Publication No. 2000-101570).

When synchronizing a transmission apparatus with a reception apparatus in order to perform continuous variable quantum key distribution, it is preferable to be able to transmit and receive light for the purpose of synchronization by using a configuration for quantum key distribution without the need to provide a separate configuration for transmitting and receiving light, even in the case in which a sufficiently large amplitude for synchronizing the reception apparatus cannot be obtained with the light used for transmission of a signal beam by the transmission apparatus.

SUMMARY

An example of an object of the present disclosure is to provide a reception apparatus, a transmission apparatus, a quantum key distribution system, and a peak position detection method that can solve the problem mentioned above.

According to a first example aspect of the present disclosure, a reception apparatus includes signal acquiring means for performing homodyne detection of a first beam transmitted from a transmission apparatus by using a second beam transmitted from the transmission apparatus and having an optical intensity higher than the first beam; and peak position detecting means for detecting a peak position, which is a timing at which there is a local maximum or a local minimum in an amplitude of a signal obtained by the homodyne detection.

According to a second example aspect of the present disclosure, a transmission apparatus includes a half-wave plate that polarizes a first beam, composed of light pulses for synchronizing the transmission apparatus with a reception apparatus, in a direction oriented at 90 degrees with respect to a second beam for homodyne detection of the first beam by the reception apparatus; and a polarizing beam splitter that combines, on the same optical axis, the first beam and the second beam, which are polarized in directions oriented at 90 degrees with respect to each other; wherein the transmission apparatus transmits light combining the first beam and the second beam on the same optical axis to the reception apparatus.

According to a third example aspect of the present disclosure, a quantum key distribution system includes a transmission apparatus and a reception apparatus, wherein the transmission apparatus transmits a first beam for synchronizing the transmission apparatus with the reception apparatus, and a second beam having an optical intensity higher than the first beam, and the reception apparatus includes signal acquiring means for performing homodyne detection of the first beam by using the second beam, and peak position detecting means for detecting a peak position, which is a timing at which there is a local maximum or a local minimum in an amplitude of a signal obtained by the homodyne detection.

According to a fourth example aspect of the present disclosure, a peak position detection method includes steps of a reception apparatus performing homodyne detection of a first beam transmitted from a transmission apparatus by using a second beam transmitted from the transmission apparatus and having an optical intensity higher than the first beam; and detecting a peak position, which is a timing at which there is a local maximum or a local minimum in an amplitude of a signal obtained by the homodyne detection.

According to a fifth example aspect of the present disclosure, a program makes a computer that controls a reception apparatus execute a step of detecting a peak position, which is a timing at which there is a local maximum or a local minimum in an amplitude of a signal obtained by the homodyne detection of a first beam transmitted from a transmission apparatus by using a second beam transmitted from the transmission apparatus and having an optical intensity higher than the first beam.

According to the present disclosure, when synchronizing a transmission apparatus with a reception apparatus in order to perform continuous variable quantum key distribution, light for the purpose of synchronization can be transmitted and received by using a configuration for quantum key distribution without the need to provide a separate configuration for transmitting and receiving light, even in the case in which a sufficiently large amplitude for synchronizing the reception apparatus cannot be obtained with the light used for transmission of a signal beam by the transmission apparatus.

EXAMPLE EMBODIMENT

Hereinafter, example embodiments of the present disclosure will be explained. However, the example embodiments below should not be construed as limiting the disclosure as claimed. Additionally, not all combinations of the features explained in the example embodiments are necessarily essential for solving the problem addressed by the disclosure.

Figure 1:
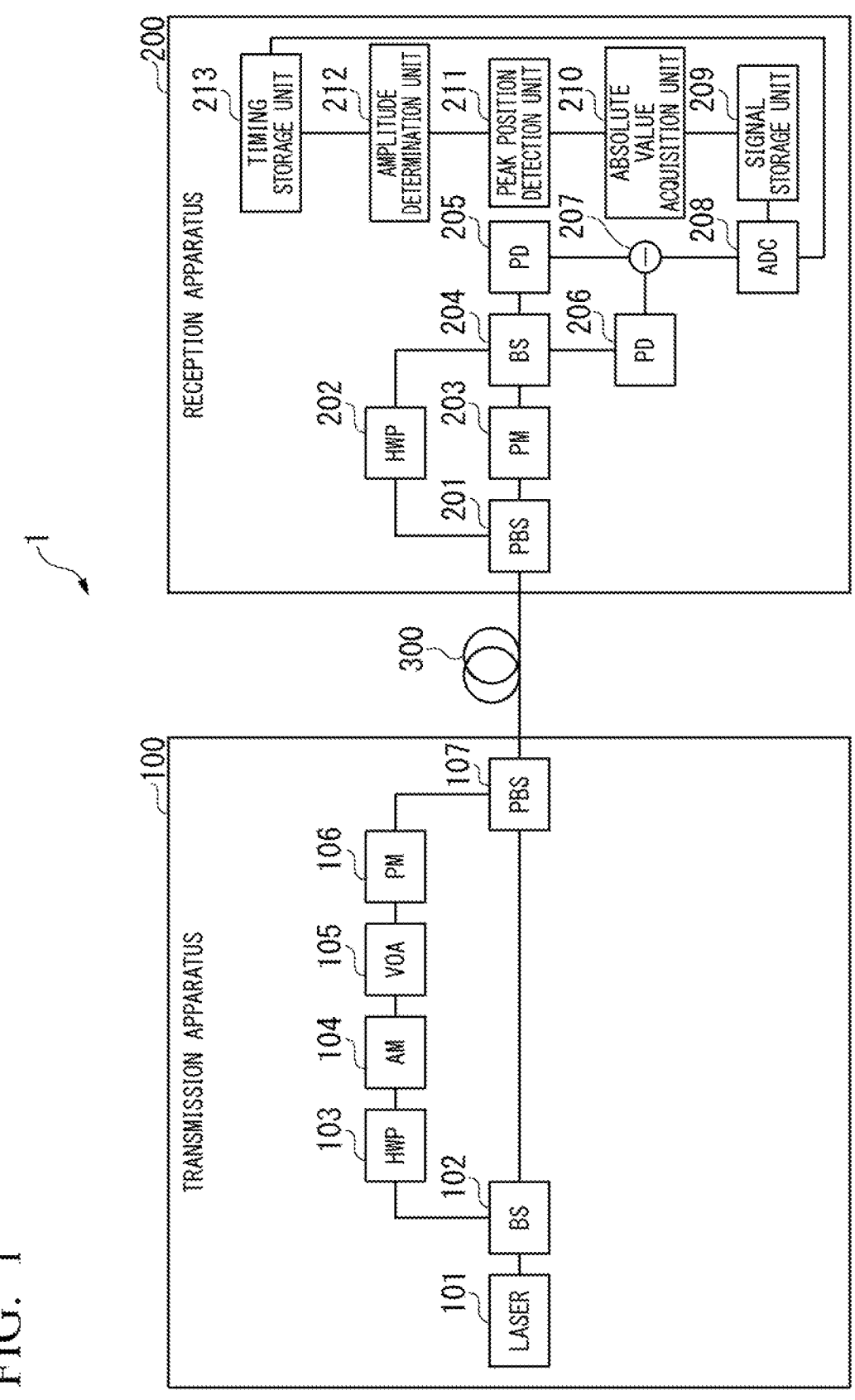
FIG. 1 is a diagram illustrating an example of the configuration of a quantum key distribution system according to an example embodiment.

FIG. 1 is a diagram illustrating an example of the configuration of a quantum key distribution system according to an example embodiment. In the configuration illustrated in FIG. 1, the quantum key distribution system 1 includes a transmission apparatus 100 and a reception apparatus 200.

The transmission apparatus 100 and the reception apparatus 200 communicate over a transmission path 300. The transmission path 300 may be a part of the quantum key distribution system 1, or may be configured to be outside the quantum key distribution system 1.

The transmission apparatus 100 will also be referred to as Alice. The reception apparatus 200 will also be referred to as Bob.

The names "transmission apparatus" and "reception apparatus" used here are names that are based on being on the transmission side and on the reception side during quantum key distribution in the explanation below. Signals can also be transmitted from the reception apparatus 200 to the transmission apparatus 100.

The transmission apparatus 100 transmits a random bit string that is to serve as the base for an encryption key to the reception apparatus 200 by means of continuous variable quantum key distribution (CV-QKD) over the transmission path 300. The transmission apparatus 100 and the reception apparatus 200 perform key distillation processes, such as basis reconciliation, error correction, and privacy amplification, on the random bit string that has been transmitted and received, so that the transmission apparatus 100 and the reception apparatus 200 acquire the same encryption key. The random bit string that is transmitted and received will also be referred to as key information. The encryption key that has been obtained will also be referred to as a final key.

In continuous variable quantum key distribution, the transmission apparatus 100 transmits to the reception apparatus 200, over the transmission path 300, a signal beam carrying the random bit string (key information) that is to serve as the base for the encryption key, and a reference beam having relatively high intensity that is used for homodyne detection of orthogonal phase amplitudes of the signal beam. Specifically, the transmission apparatus 100 performs phase modulation on the signal beam by means of light pulses to make the signal beam carry the random bit string that is to serve as the base for the encryption key. In quantum key distribution, homodyne detection is performed on the reception side in order to detect the random bit string carried by the signal beam.

Additionally, the transmission apparatus 100 and the reception apparatus 200 are synchronized before the transmission and reception of the signal beam carrying the random bit string that is to serve as the base for the encryption key. Specifically, the reception apparatus 200 adjusts the sampling timing of the signal beam in accordance with the phase of light transmitted by the transmission apparatus 100.

Synchronization is necessary in order for the reception apparatus 200 to correctly acquire the information carried on the signal beam due to phase modulation by the transmission apparatus 100.

Thus, the transmission apparatus 100 and the reception apparatus 200 are synchronized by using the light that is used as the signal beam when transmitting the random bit string (the light carrying the random bit string). Hereinafter, the light used as the signal beam when transmitting the random bit string will be referred to as the signal beam even in connection with the process for synchronizing the transmission apparatus 100 with the reception apparatus 200.

In the synchronization process, the transmission apparatus 100 transmits the signal beam without modulation by light pulses, and the reception apparatus 200 detects a peak position of the received signal beam. The peak position of the signal beam mentioned here is a timing at which there is a local maximum or a local minimum in the intensity of the signal beam.

Figure 2:
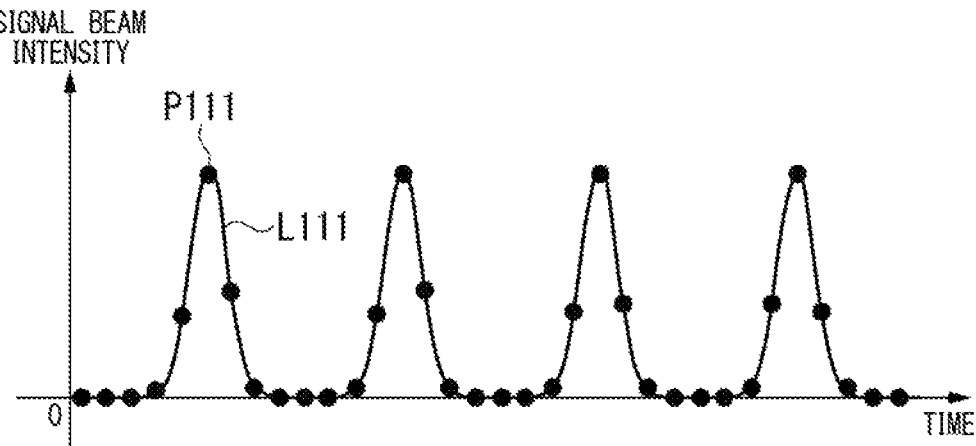
FIG. 2 is a diagram illustrating examples of peak positions detected by a reception apparatus according to an example embodiment.

FIG. 2 is a diagram illustrating examples of peak positions detected by the reception apparatus 200. The horizontal axis of the graph in FIG. 2 represents time. The vertical axis represents the intensity of the signal beam.

The line L111 indicates an example of the intensity, over time, of the signal beam received by the reception apparatus 200. The points such as the point P111 indicate examples of sampling points at which a voltage signal obtained by observing the signal beam was sampled by an analog/digital converter.

The reception apparatus 200 detects the timings (times) at which there are local maxima in the intensity of the signal beam due to the light pulses, such as at the point P111.

The case in which the transmission apparatus can transmit, as a signal beam, light that is sufficiently stronger than a quantum beam will be tentatively considered here. In this case, when synchronizing the transmission apparatus with the reception apparatus, having the transmission apparatus transmit only the signal beam without transmitting the reference beam can be contemplated. In this case, the reception apparatus measures the intensity (amplitude) of the signal beam by using a single photodiode and detects the timings at which the intensity thereof exhibits maximum values.

However, in the case in which the amplitude of the light pulses transmitted as the signal beam is small, it is difficult for the reception apparatus to obtain the maximum values of the pulses by means of the intensity measurements described above. In continuous variable quantum key distribution, the signal beam must be made weak enough to be able to detect quantum dynamic state changes. Thus, the signal beam is transmitted with very weak light. Although measures such as providing the transmission apparatus with a variable optical attenuator to allow the intensity of the signal beam to be modulated are taken, there are limits on the variable attenuation rate attainable by a variable optical attenuator. Even if the variable optical attenuator is set to transmit as much of the signal beam as possible, as mentioned above, there may be cases in which the reception apparatus cannot obtain the amplitude necessary for performing accurate timing detection using a single photodiode.

Figure 3:
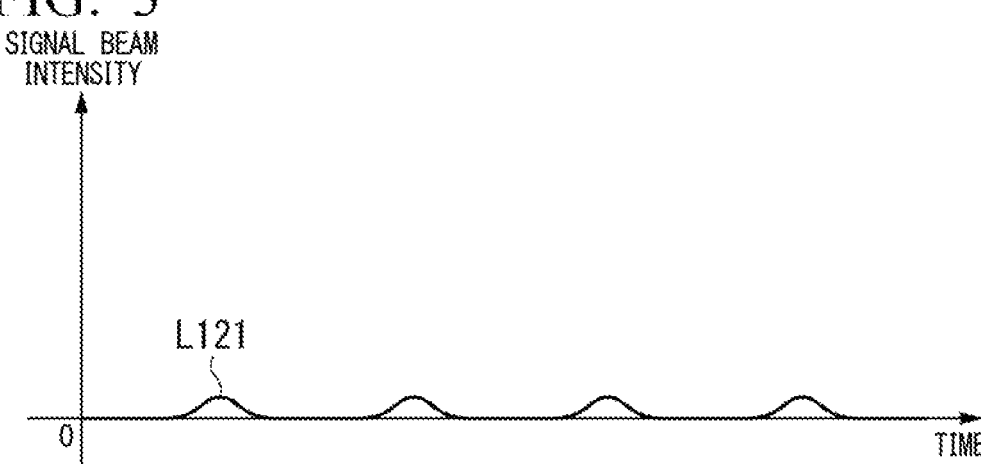
FIG. 3 is a diagram illustrating an example of the intensity of a signal beam in the case in which the reception apparatus cannot perform accurate timing detection using a single photodiode.

FIG. 3 is a diagram indicating an example of the intensity of a signal beam in the case in which the reception apparatus cannot perform accurate timing detection using a single photodiode. The horizontal axis of the graph in FIG. 3 represents time. The vertical axis represents the intensity of the signal beam.

The line L121 represents an example of the intensity, over time, of the signal beam received by the reception apparatus. Due to the intensity of the signal being low, as in the example in FIG. 3, there may be situations in which accurate timing detection cannot be performed because the reception apparatus cannot accurately detect the peak positions of the signal beam using a single photodiode.

Thus, in the quantum key distribution system 1, the reception apparatus 200 performs homodyne detection of the orthogonal phase amplitudes of the signal beam, even during the process of synchronizing the transmission apparatus 100 with the reception apparatus 200. The reception apparatus 200 can amplify the signals indicating the orthogonal phase amplitudes of a reception beam by means of homodyne detection. As a result thereof, the reception apparatus 200 can more accurately detect the peak positions of the signal beam and is expected to be able to more accurately synchronize the transmission apparatus 100 with the reception apparatus 200.

The reception apparatus 200 compares the absolute values of pulse peaks acquired by homodyne detection with a threshold value for the purpose of identifying peak positions, and thus acquires the peak positions by selecting peak positions with amplitudes that are large enough to be able to accurately acquire the peak positions.

In the configuration illustrated in FIG. 1, the transmission apparatus 100 includes a laser light source 101, a beam splitter (BS) 102, a half-wave plate (HWP) 103, an amplitude modulator (AM), a variable optical attenuator (VOA) 105, a phase modulator (PM) 106, and a polarizing beam splitter (PBS) 107.

When transmitting a random bit string that is to serve as the base for an encryption key from the transmission apparatus 100 to the reception apparatus 200, the laser light source 101 generates and outputs a continuous-wave laser beam. The continuous-wave laser beam will also be referred to as a CW beam.

The beam splitter 102 splits the CW beam output by the laser light source 101 into two paths. The CW beams output from the beam splitter 102 are used as a reference beam and a signal beam.

Of the CW beams output by the beam splitter 102, the half-wave plate 103 rotates the polarization of the signal beam by 90° (degrees).

The amplitude modulator 104 converts the signal beam into pulses. Specifically, the amplitude modulator 104 performs amplitude modulation on the polarization-rotated CW beam output from the half-wave plate 103, thereby converting the CW beam into a pulsed beam.

The variable optical attenuator 105 modulates the optical intensity of the signal beam output by the amplitude modulator 104.

The phase modulator 106 performs phase modulation on the signal beam output from the variable optical attenuator 105. As a result thereof, the phase modulator 106 makes the signal beam carry the random bit string that is to serve as the base for the encryption key.

The polarizing beam splitter 107 combines the reference beam and the signal beam on the same optical axis. As a result thereof, the beam splitter 107 polarization-multiplexes the signal beam and the reference beam, which are 90° orthogonal to each other.

The beam obtained by the polarizing beam splitter 107 combining the reference beam and the signal beam on the same optical axis is transmitted to the reception apparatus 200.

The reception apparatus 200 includes a polarizing beam splitter 201, a half-wave plate 202, a phase modulator 203, a beam splitter 204, two photodiodes 205 and 206, a subtraction unit 207, an analog/digital converter (ADC) 208, a signal storage unit 209, an absolute value acquisition unit 210, a peak position detection unit 211, an amplitude determination unit 212, and a timing storage unit 213.

The combination of the polarizing beam splitter 201, the half-wave plate 202, the phase modulator 203, the beam splitter 204, and the two photodiodes 205 and 206 will also be referred to as the optics system of the reception apparatus 200. The combination of the analog/digital converter 208, the signal storage unit 209, the absolute value acquisition unit 210, the peak position detection unit 211, the amplitude determination unit 212, and the timing storage unit 213 will also be referred to as the signal processing system of the reception apparatus 200.

The signal processing system or a portion thereof may be configured to use dedicated hardware. The functions of the signal processing system or a portion thereof may be executed by using a computer.

The polarizing beam splitter 201 separates the beam transmitted from the transmission apparatus 100 over the transmission path 300 into the signal beam and the reference beam.

The half-wave plate 202 rotates the polarization of the signal beam output from the polarizing beam splitter 201 by 90°.

The phase modulator 203 performs phase modulation for basis selection on the reference beam output by the polarizing beam splitter 201.

The beam splitter 204 causes interference between the signal beam output by the half-wave plate 202 and the reference beam output by the phase modulator 203.

The photodiodes 205 and 206 respectively detect the beams after undergoing interference by the beam splitter 204. Specifically, the photodiodes 205 and 206 photoelectrically convert the beams input respectively thereto.

The subtraction unit 207 outputs a difference signal obtained by subtracting the beam detection results of the photodiode 206 from the beam detection results of the photodiode 205. The difference signal output by the subtraction unit 207 is converted from a current signal to a voltage signal. For example, a balance detector including the subtraction unit 207 and the photodiodes 205 and 206 amplifies the difference signal and converts the signal to voltage, and outputs the result to the analog/digital converter 208.

The magnitude of the amplitude of the signal output by the subtraction unit 207 is proportional to the magnitude obtained by multiplying the magnitude of the amplitude of the signal beam output by the beam splitter 204 with the magnitude of the amplitude of the reference beam. In this case, the signal beam is transmitted as a weak beam in order to make use of quantum dynamic properties, whereas the reference beam is transmitted as a relatively strong beam. The signal output by the subtraction unit 207 can amplify the weak signal beam after phase modulation by the phase modulator 203.

In the case in which the reference beam transmitted by the transmission apparatus 100 to the reception apparatus 200 is a CW beam, the reference beam is not directly used to synchronize the transmission apparatus 100 with the reception apparatus 200, as mentioned above. Additionally, when the signal beam from the transmission apparatus 100 to the reception apparatus 200 is directly used, there may be situations in which sufficient signal intensity cannot be obtained for synchronizing the transmission apparatus 100 with the reception apparatus 200, even when maximizing the intensity of the signal beam, as mentioned above.

In contrast therewith, the reception apparatus 200, by performing homodyne detection of the signal beam by using the reference beam, can amplify the signal beam transmitted as a pulsed beam, and the transmission apparatus 100 can be expected to be able to be synchronized with the reception apparatus 200 with relatively high accuracy.

The process by which the beam splitter 204 causes interference between the signal beam and the reference beam, the photodiodes 205 and 206 respectively detect the beams after the interference, and the subtraction unit 207 outputs the difference signal between the beam detection results of the photodiodes 205 and 206 corresponds to an example of homodyne detection. The combination of the beam splitter 204, the photodiodes 205 and 206, and the subtraction unit 207 corresponds to an example of signal acquiring means.

The analog/digital converter 208 converts, from an analog signal to a digital signal, the voltage signal indicating the difference obtained by subtracting the beam detection results of the photodiode 206 from the beam detection results of the photodiode 205. As mentioned above, the signal indicating the difference obtained by subtracting the beam detection results of the photodiode 206 from the beam detection results of the photodiode 205 corresponds to a signal obtained by amplifying the signal beam after phase modulation by the phase modulator 203.

The signal storage unit 209 records the digital signal output by the analog/digital converter 208.

The absolute value acquisition unit 210 takes the absolute value of the amplitude of the signal stored by the signal storage unit 209. The absolute value acquisition unit 210 corresponds to an example of the absolute value acquiring means.

The peak position detection unit 211 detects the peak positions in the signal, output by the absolute value acquisition unit 210, obtained by taking the absolute value of the signal stored in the signal storage unit 209. The peak positions of the signal mentioned here are the timings at which there are local maxima in the amplitude of the signal. The peak position detection unit 211 corresponds to an example of peak position detecting means.

The amplitude determination unit 212 identifies whether the amplitude of the signal obtained by the absolute value acquisition unit 210 taking the absolute value is greater than the threshold value at the peak positions detected by the peak position detection unit 211. The amplitude determination unit 212 corresponds to an example of an amplitude determining means.

The timing storage unit 213 stores the peak positions (timings at which there are local maxima in the amplitude of the signal) detected by the peak position detection unit 211 in the case in which the amplitude determination unit 212 has determined that the amplitude is greater than the threshold value. The timing storage unit 213 corresponds to an example of a timing storage means.

Even during the process of synchronizing the transmission apparatus 100 with the reception apparatus 200, the laser light source 101 generates and outputs a CW beam.

The beam splitter 102 splits the CW beam output by the laser light source 101 into two paths. As mentioned above, as in the case of transmitting and receiving the random bit string that is to serve as the base of the encryption key, in the process for synchronizing the transmission apparatus 100 with the reception apparatus 200 also, of the CW beams output by the beam splitter 102, the beam with the lower intensity or a beam obtained by performing a process, such as phase rotation and pulse conversion, on that beam will be referred to as the signal beam. In the process of synchronizing the transmission apparatus 100 with the reception apparatus 200 also, of the CW beams output from the beam splitter 102, the beam with the higher intensity will be referred to as the reference beam. This signal beam will also be referred to as a first beam and the reference beam will also be referred to as a second beam.

Of the CW beams output by the beam splitter 102, the half-wave plate 103 rotates the polarization of the signal beam by 90°. As a result thereof, the transmission apparatus 100 makes the polarization of the signal beam orthogonal to the polarization of the reference beam, and transmits the beams.

The amplitude modulator 104 converts the signal beam into pulses. As mentioned above, the amplitude modulator 104 performs amplitude modulation on the polarization-rotated CW beam output by the half-wave plate 103, thereby converting the CW beam to a pulsed beam.

Additionally, in the process of synchronizing the transmission apparatus 100 with the reception apparatus 200, the variable optical attenuator 105 fully transmits the signal beam output by the half-wave plate 103. As a result thereof, the transmission apparatus 100 increases the optical intensity of the signal beam transmitted to the reception apparatus 200 as much as possible.

Additionally, in the process of synchronizing the transmission apparatus 100 with the reception apparatus 200, the phase modulator 106 outputs the signal beam output by the variable optical attenuator 105 directly to the variable optical attenuator 105 without performing phase modulation thereon.

The polarizing beam splitter 107 combines the reference beam and the signal beam on the same optical axis. As a result thereof, the polarizing beam splitter 107 polarization-multiplexes the signal beam and the reference beam, which are 90° orthogonal to each other.

Furthermore, the signal beam and the reference beam can be transmitted to the reception apparatus by being time-division multiplexed by the path differences therebetween. That is, the transmission apparatus 100 may transmit the signal beam and the reference beam at different timings due to the difference between the path length of the signal beam and the path length of the reference beam.

In the reception apparatus 200, the polarizing beam splitter 201 separates the beam that has been transmitted from the transmission apparatus 100 over the transmission path 300 into a signal beam and a reference beam.

The half-wave plate 202 rotates the polarization of the reference beam output by the polarizing beam splitter 201 by 90° and inputs the reference beam to the beam splitter 204.

Additionally, in the process of synchronizing the transmission apparatus 100 with the reception apparatus 200, the phase modulator 203 inputs the reference beam output by the polarizing beam splitter 201 directly to the beam splitter 204 without performing modulations thereon.

The beam splitter 204 causes interference between the signal beam output by the half-wave plate 202 and the reference beam output by the phase modulator 203.

The photodiodes 205 and 206 respectively detect the beams after undergoing interference by the beam splitter 204. Specifically, the photodiodes 205 and 206 photoelectrically convert the beams input respectively thereto.

The subtraction unit 207 outputs a difference signal obtained by subtracting the beam detection results of the photodiode 206 from the beam detection results of the photodiode 205. The difference signal output by the subtraction unit 207 is converted from a current signal to a voltage signal.

The process by which the beam splitter 204 causes interference between the signal beam and the reference beam, the photodiodes 205 and 206 respectively detect the beams after the interference, and the subtraction unit 207 outputs the difference signal between the beam detection results of the photodiodes 205 and 206 corresponds to an example of homodyne detection.

The magnitude of the amplitude of the difference signal obtained in the case in which homodyne detection is performed by the reception apparatus 200 is determined by the intensity of the reference beam and the intensity of the signal beam. As mentioned above, the magnitude of the amplitude of the difference signal is proportional to the magnitude obtained by multiplying the magnitude of the amplitude of the signal beam output with the magnitude of the amplitude of the reference beam. The greater the intensity of the reference beam is, the greater the amplitude of the difference signal is, and the more easily the orthogonal phase amplitudes of a weak beam can be read.

Meanwhile, external disturbances on the quantum key distribution system 1, such as vibrations and temperature changes, can cause phase fluctuations to occur in the signal beam and the reference beam. As a result thereof, there may be situations in which the amplitude of the difference signal output by the subtraction unit 207 becomes small.

Figure 4:
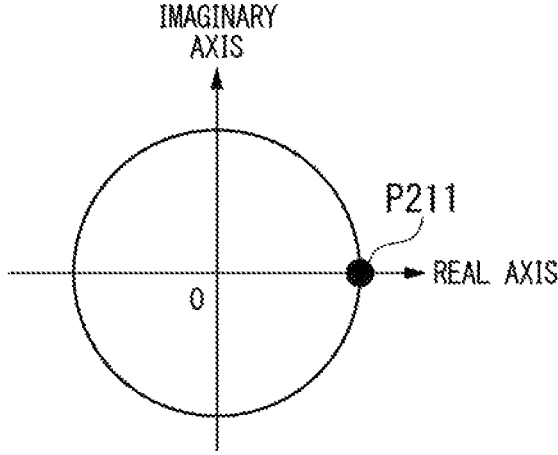
FIG. 4 is a diagram illustrating a first example of the phase difference between a signal beam and a reference beam in an example embodiment.

FIG. 4 is a diagram illustrating a first example of the phase difference between the signal beam and the reference beam. The horizontal axis in the graph in FIG. 4 represents the real axis. The vertical axis represents the imaginary axis.

The graph in FIG. 4 represents the phase difference between the signal beam and the reference beam as the rotation angle with respect to the positive direction on the real axis, and the point P211 represents the case in which the phase difference is 0°.

Figure 5:
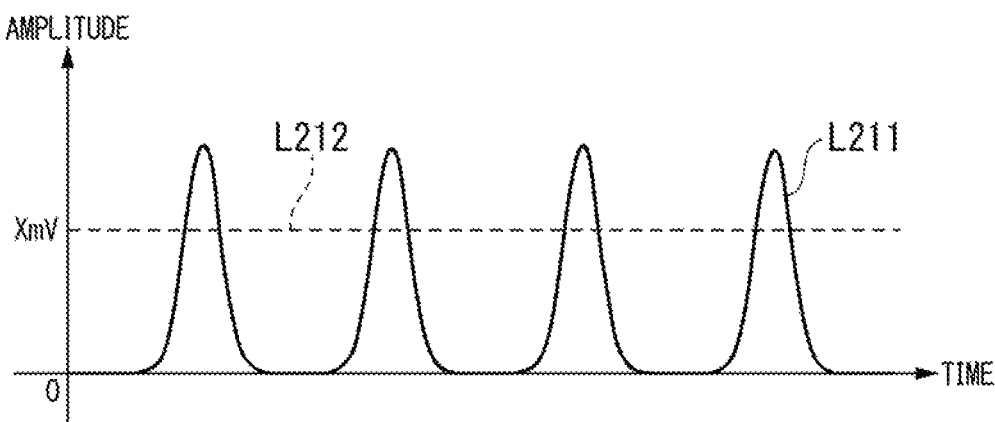
FIG. 5 is a diagram illustrating a first example of the amplitude of a difference signal output by a subtraction unit according to an example embodiment.

FIG. 5 is a diagram illustrating a first example of the amplitude of the difference signal output by the subtraction unit 207. FIG. 5 shows an example of the amplitude of the difference signal in the case in which the phase difference between the signal beam and the reference beam is close to 0°, as in the example in FIG. 4. The horizontal axis of the graph in FIG. 5 represents time. The vertical axis represents the amplitude of the difference signal.

The line L211 represents an example of the amplitude over time of the difference signal output by the subtraction unit 207. The line L212 represents the threshold value XmV for the amplitude of the difference signal.

In the case in which the phase difference between the signal beam and the reference beam is close to 0°, as in the examples in FIG. 4 and FIG. 5, pulses with a large amplitude on the positive side of the vertical axis are obtained as the difference signal. Since the amplitude of the difference signal is large, the change in amplitude near the peaks at which there are local maxima of the amplitude is relative large, and the reception apparatus 200 can be expected to be able to detect the peak positions of the difference signal with relative accuracy.

Figure 6:
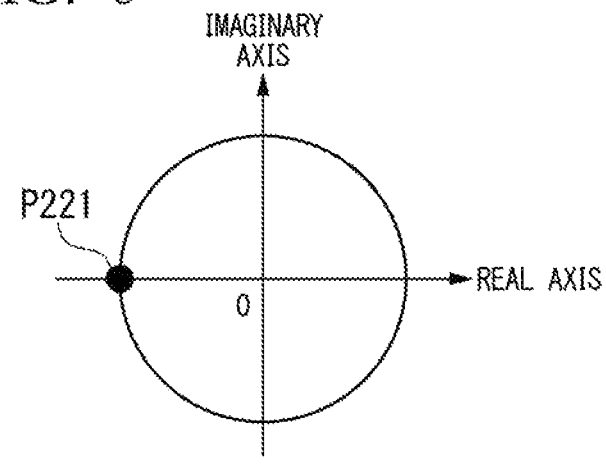
FIG. 6 is a diagram illustrating a second example of the phase difference between a signal beam and a reference beam in an example embodiment.

FIG. 6 is a diagram illustrating a second example of the phase difference between the signal beam and the reference beam. The horizontal axis in the graph in FIG. 6 represents the real axis. The vertical axis represents the imaginary axis.

The graph in FIG. 6 represents the phase difference between the signal beam and the reference beam as the rotation angle with respect to the positive direction on the real axis, and the point P221 represents the case in which the phase difference is 180°.

Figure 7:
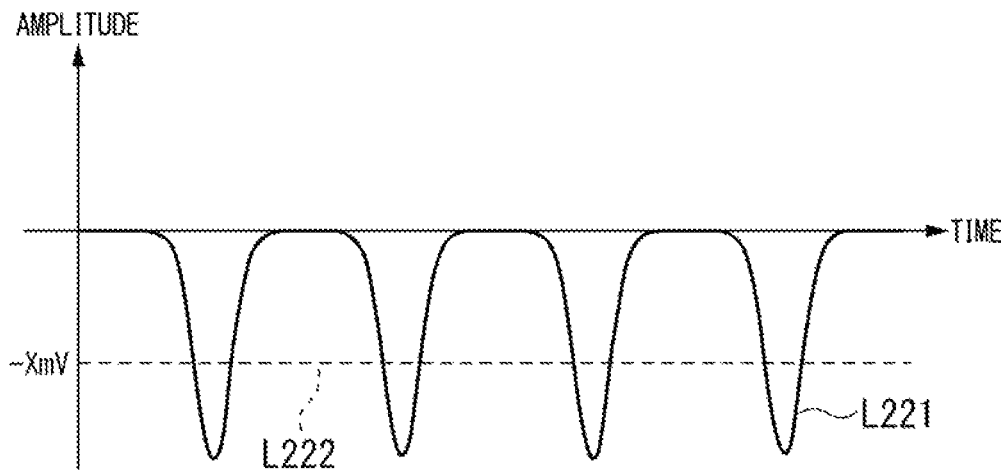
FIG. 7 is a diagram illustrating a second example of the amplitude of a difference signal output by a subtraction unit according to an example embodiment.

FIG. 7 is a diagram illustrating a second example of the amplitude of the difference signal output by the subtraction unit 207. FIG. 7 shows an example of the amplitude of the difference signal in the case in which the phase difference between the signal beam and the reference beam is close to 180°, as in the example in FIG. 6. The horizontal axis of the graph in FIG. 7 represents time. The vertical axis represents the amplitude of the difference signal.

The line L221 represents an example of the amplitude over time of the difference signal output by the subtraction unit 207. The line L222 represents the threshold value −XmV for the amplitude of the difference signal.

In the case in which the phase difference between the signal beam and the reference beam is close to 180°, as in the examples in FIG. 6 and FIG. 7, pulses with a large amplitude on the negative side of the vertical axis are obtained as the difference signal. Since the amplitude of the difference signal is large, the change in amplitude near the peaks at which there are local minima of the amplitude is relative large, and the reception apparatus 200 can be expected to be able to detect the peak positions of the difference signal with relative accuracy.

Figure 8:
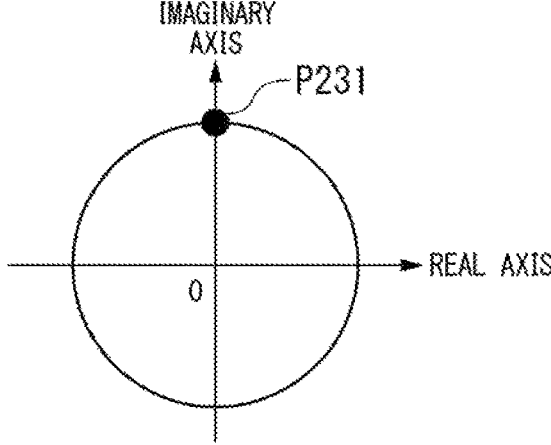
FIG. 8 is a diagram illustrating a third example of the phase difference between a signal beam and a reference beam in an example embodiment.

FIG. 8 is a diagram illustrating a third example of the phase difference between the signal beam and the reference beam. The horizontal axis in the graph in FIG. 8 represents the real axis. The vertical axis represents the imaginary axis.

The graph in FIG. 8 represents the phase difference between the signal beam and the reference beam as the rotation angle with respect to the positive direction on the real axis, and the point P231 represents the case in which the phase difference is 90°.

Figure 9:
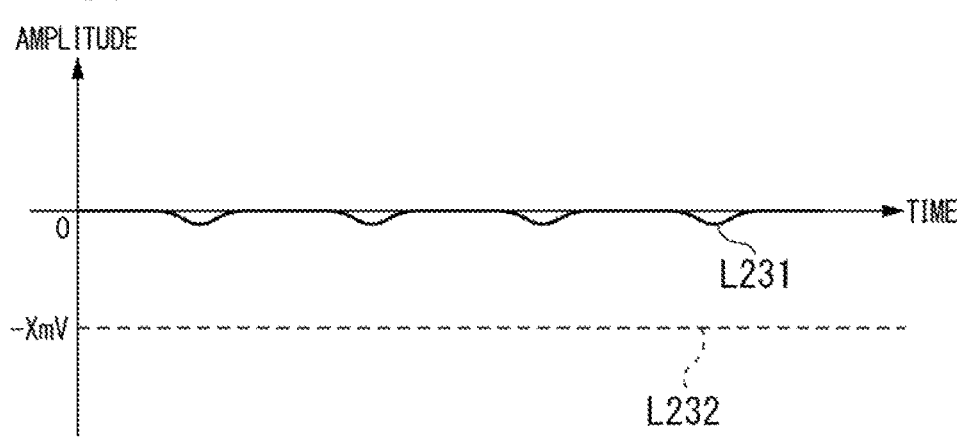
FIG. 9 is a diagram illustrating a third example of the amplitude of a difference signal output by a subtraction unit according to an example embodiment.

FIG. 9 is a diagram illustrating a third example of the amplitude of the difference signal output by the subtraction unit 207. FIG. 9 shows an example of the amplitude of the difference signal in the case in which the phase difference between the signal beam and the reference beam is close to 90°, as in the example in FIG. 8. In particular, FIG. 9 shows an example of the case in which the phase difference between the signal beam and the reference beam is slightly larger than 90°. The horizontal axis of the graph in FIG. 9 represents time. The vertical axis represents the amplitude of the difference signal.

The line L231 represents an example of the amplitude over time of the difference signal output by the subtraction unit 207. The line L232 represents the threshold value −XmV for the amplitude of the difference signal.

In the case in which the phase difference between the signal beam and the reference beam is close to 90°, as in the examples in FIG. 8 and FIG. 9, pulses with a small amplitude are obtained as the difference signal. For example, pulses with a small amplitude on the negative side of the vertical axis are obtained as the difference signal with the phase difference between the signal beam and the reference beam slightly larger than 90°. Since the amplitude of the difference signal is small, the change in amplitude near the peaks at which there are local maxima or local minima of the amplitude is relative small, and there may be situations in which the reception apparatus 200 cannot accurately detect the peak positions.

Figure 10:
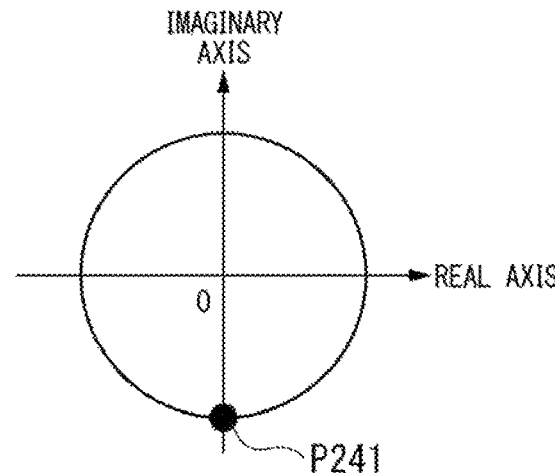
FIG. 10 is a diagram illustrating a fourth example of the phase difference between a signal beam and a reference beam in an example embodiment.

FIG. 10 is a diagram illustrating a fourth example of the phase difference between the signal beam and the reference beam. The horizontal axis in the graph in FIG. 10 represents the real axis. The vertical axis represents the imaginary axis.

The graph in FIG. 10 represents the phase difference between the signal beam and the reference beam as the rotation angle with respect to the positive direction on the real axis, and the point P241 represents the case in which the phase difference is 270°.

Figure 11:
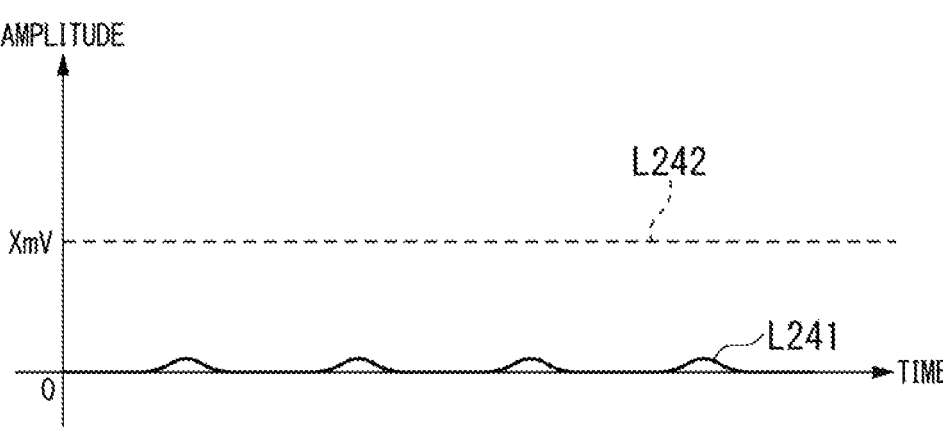
FIG. 11 is a diagram illustrating a fourth example of the amplitude of a difference signal output by a subtraction unit according to an example embodiment.

FIG. 11 is a diagram illustrating a fourth example of the amplitude of the difference signal output by the subtraction unit 207. FIG. 11 shows an example of the amplitude of the difference signal in the case in which the phase difference between the signal beam and the reference beam is close to 270°, as in the example in FIG. 10. In particular, FIG. 11 shows an example of the case in which the phase difference between the signal beam and the reference beam is slightly larger than 270°. The horizontal axis of the graph in FIG. 11 represents time. The vertical axis represents the amplitude of the difference signal.

The line L241 represents an example of the amplitude over time of the difference signal output by the subtraction unit 207. The line L242 represents the threshold value XmV for the amplitude of the difference signal.

In the case in which the phase difference between the signal beam and the reference beam is close to 270°, as in the examples in FIG. 10 and FIG. 11, pulses with a small amplitude are obtained as the difference signal. For example, pulses with a small amplitude on the positive side of the vertical axis are obtained as the difference signal with the phase difference between the signal beam and the reference beam slightly larger than 270°. Since the amplitude of the difference signal is small, the change in amplitude near the peaks at which there are local maxima or local minima of the amplitude is relative small, and there may be situations in which the reception apparatus 200 cannot accurately detect the peak positions. Thus, the amplitude of the difference signal output by the subtraction unit 207 fluctuates between positive and negative within an amplitude range determined by the optical intensity.

Figure 12:
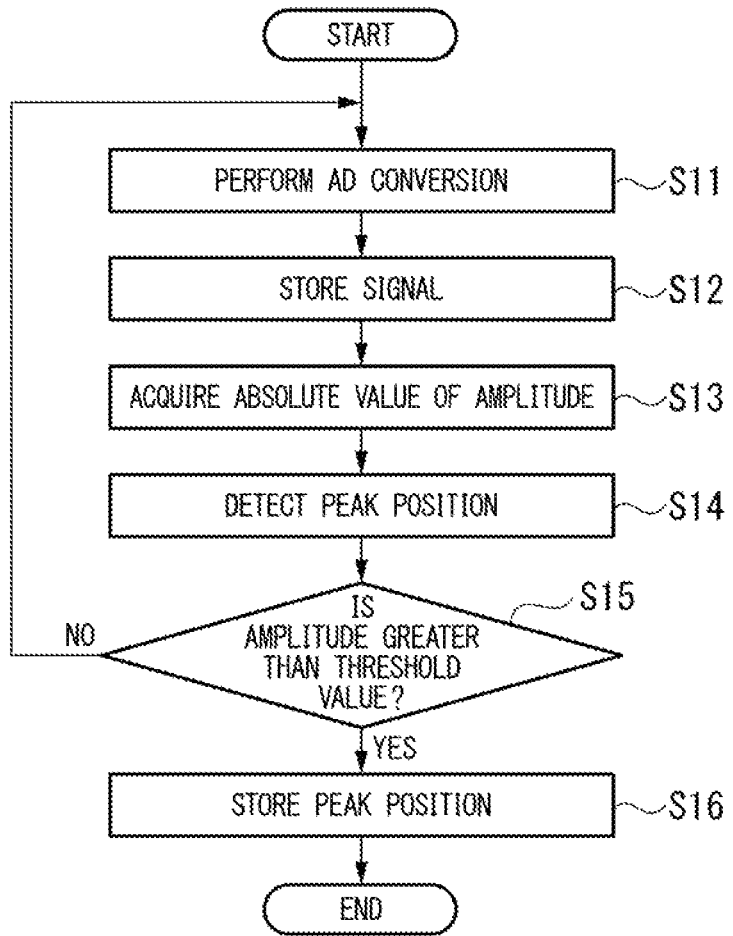
FIG. 12 is a diagram illustrating an example of a processing procedure by which a reception apparatus according to an example embodiment detects a peak position in a difference signal output by the subtraction unit.

FIG. 12 is a diagram indicating an example of the processing procedure by which the reception apparatus 200 detects a peak position in the difference signal output by the subtraction unit 207.

In the signal processing system in the reception apparatus 200, the analog/digital converter 208 converts the difference signal output by the subtraction unit 207 from an analog signal to a digital signal (step S11), and the signal storage unit 209 stores the digitally converted signal (step S12).

After the absolute value acquisition unit 210 has taken the absolute value of the amplitude of the signal stored in the signal storage unit 209 (step S13), the peak position detection unit 211 detects a peak position (a point at which there is a local maximum in the amplitude) in the signal for which the absolute value was taken by the absolute value acquisition unit 210 (step S14).

The amplitude determination unit 212 compares the amplitude of the signal at the peak position detected by the peak position detection unit 211 with the threshold value (step S15).

In the case in which the amplitude determination unit 212 has determined that an amplitude greater than the threshold value has been obtained (step S15: YES), the timing storage unit 213 stores the peak position detected by the peak position detection unit 211 (step S16).

After step S16, the reception apparatus 200 ends the process in FIG. 12.

On the other hand, in the case in which the amplitude determination unit 212 has determined that the magnitude of the amplitude is less than or equal to the threshold value (step S15: NO), the process returns to step S11. In this case, the reception apparatus 200 repeats the process from steps S11 to S15 until an amplitude higher than the threshold value is obtained.

Although the pulse peaks of the difference signal fluctuate up and down due to phase fluctuations as mentioned above, the reception apparatus 200 can be expected to be able to reliably obtain peak positions by repeating the processes from steps S11 to S15.

The signal acquiring means that is based on a combination of the beam splitter 204, the photodiodes 205 and 206, and the subtraction unit 207, as mentioned above, performs homodyne detection of the signal beam (first beam) transmitted from the transmission apparatus by using the reference beam (second beam) transmitted from the transmission apparatus 100 and having an optical intensity higher than the signal beam. The peak position detection unit 211 detects the peak positions at timings at which the amplitude of the signal obtained by homodyne detection has local maxima or local minima.

With the reception apparatus 200, when synchronizing the transmission apparatus 100 with the reception apparatus 200 in order to perform continuous variable quantum key distribution, even in the case in which the reference beam cannot be directly used and a sufficiently large amplitude for synchronizing the reception apparatus 200 cannot be obtained with the light used for transmission of the signal beam by the transmission apparatus 100, light for the purpose of synchronization can be transmitted and received by using the configuration for quantum key distribution without the need to provide a separate configuration for transmitting and receiving light.

In particular, the signal acquiring means formed by the combination of the beam splitter 204, the photodiodes 205 and 206, and the subtraction unit 207 can obtain an optical amplification effect of weak light by making the signal beam interfere with a reference beam having strong optical power during homodyne detection, thereby allowing a signal with a relatively large amplitude to be detected, even in the case in which the intensity of the signal beam is low. By detecting the peak positions of the signal obtained by homodyne detection, the peak position detection unit 211 can detect the peak positions of a signal with a relatively large amplitude. Due to this feature, the peak position detection unit 211 can be expected to be able to detect the peak positions with relative accuracy.

Additionally, the absolute value acquisition unit 210 takes the absolute value of the amplitude of the signal obtained by homodyne detection. The peak position detection unit 211 detects, as the peak positions, the timings at which there are local maxima in the amplitude of a signal that is the absolute value of the amplitude of the signal obtained by homodyne detection.

In this case, there may be situations in which external disturbances, such as vibrations and temperature changes, cause fluctuations in the phase of the signal beam and the phase of the reference beam received by the reception apparatus 200, thereby causing fluctuations in the amplitude of the signal obtained by homodyne detection. In particular, there may be situations in which the amplitude of the signal obtained by homodyne detection fluctuates towards the positive side and the negative side.

In contrast therewith, due to the absolute value acquisition unit 210 taking the absolute value of the amplitude of the signal, the peak detection unit 211 merely needs to detect the timings at which there are local maxima in the amplitude, and there is no need to detect the timings at which there are local minima in the amplitude. With the reception apparatus 200, due to this feature, the peak position detection unit 211 can relatively lighten the load of the processing for detecting the peak positions.

Additionally, the amplitude determination unit 212 determines whether or not the magnitude of the amplitude at a peak position detected by the peak position detection unit 211 is greater than a predetermined threshold value. The timing storage unit 213 stores the peak position in the case in which the amplitude determination unit 212 has determined that the magnitude of the amplitude at the peak position is greater than the threshold value. In the case in which the amplitude determination unit 212 has determined that the magnitude of the amplitude at the peak position is lower than or equal to the threshold value, homodyne detection of the signal beam by the signal acquiring means (the combination of the beam splitter 204, the photodiodes 205 and 206, and the subtraction unit 207), detection of a peak position by the peak position detection unit 211, and the determination of whether or not the magnitude of the amplitude at the peak position is greater than the threshold value by the amplitude determination unit 212 are repeated.

According to the reception apparatus 200, it is possible to determine whether or not a signal with a sufficiently large amplitude is obtained with respect to fluctuations in the amplitude of the signal obtained by homodyne detection, and to detect peak positions in the case in which a signal with a sufficiently large amplitude is obtained. With the reception apparatus 200, due to this feature, peak positions can be detected with relative accuracy.

Additionally, according to the reception apparatus 200, in the case in which a signal with a sufficiently large amplitude is not obtained, the peak positions can be detected after having obtained a signal with a sufficiently large amplitude, and due to this feature, the peak positions can be detected with relative accuracy.

Additionally, the half-wave plate 103 polarizes the first beam (signal beam), composed of light pulses for synchronizing the transmission apparatus 100 with the reception apparatus 200, in a direction oriented at 90 degrees with respect to the second beam (reference beam) for the reception apparatus 200 to perform homodyne detection of the first beam. The polarizing beam splitter 107 combines the first beam and the second beam, which are polarized in directions oriented at 90 degrees with respect to each other, on the same optical axis. The transmission apparatus 100 transmits, to the reception apparatus 200, the light obtained by combining the first beam and the second beam on the same optical axis.

With the transmission apparatus 100, the reception apparatus 200 that has received the beams transmitted by the transmission apparatus 100 can use the second beam to perform homodyne detection of the first beam.

Figure 13:
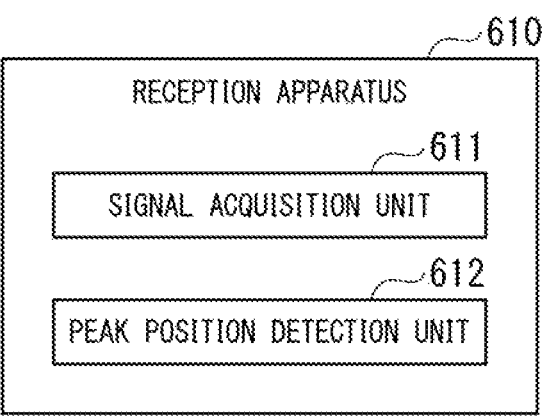
FIG. 13 is a diagram illustrating another example of the configuration of a reception apparatus according to an example embodiment.

FIG. 13 is a diagram illustrating one more example of the configuration of the reception apparatus according to an example embodiment. In the configuration illustrated in FIG. 13, the reception apparatus 610 includes a signal acquisition unit 611 and a peak position detection unit 612.

In this configuration, the signal acquisition unit 611 performs homodyne detection of the first beam transmitted from the transmission apparatus by using the second beam transmitted from the transmission apparatus and having a higher optical intensity than the first beam. The peak position detection unit 612 detects the peak positions which are timings at which there are local maxima or local minima in the amplitude of the signal obtained by homodyne detection.

The signal acquisition unit 611 corresponds to an example of a signal acquiring means. The peak position detection unit 612 corresponds to an example of a peak position detecting means.

According to the reception apparatus 610, when synchronizing the transmission apparatus with the reception apparatus 610 in order to perform continuous variable quantum key distribution, even in the case in which a sufficiently large amplitude for synchronizing the reception apparatus 610 cannot be obtained with the first beam used for transmission of the signal beam by the transmission apparatus, and the second beam that is used as the reference beam cannot be directly used for synchronization, light for the purpose of synchronization can be transmitted and received by using the configuration for quantum key distribution without the need to provide a separate configuration for transmitting and receiving light.

In particular, the signal acquisition unit 611 can obtain an optical amplification effect of weak light by making the signal beam interfere with a reference beam having strong optical power during homodyne detection, thereby allowing a signal with a relatively large amplitude to be detected, even in the case in which the intensity of the signal beam is low. By detecting the peak positions of the signal obtained by homodyne detection, the peak position detection unit 612 can detect the peak positions of a signal with a relatively large amplitude. Due to this feature, the peak position detection unit 612 can be expected to be able to detect the peak positions with relative accuracy.

Figure 14:
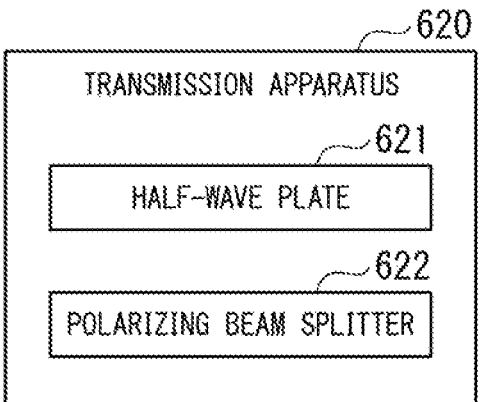
FIG. 14 is a diagram illustrating another example of the configuration of a transmission apparatus according to an example embodiment.

FIG. 14 is a diagram illustrating one more example of the configuration of the reception apparatus according to an example embodiment. In the configuration illustrated in FIG. 14, the transmission apparatus 620 includes a half-wave plate 621 and a polarizing beam splitter 622.

In this configuration, the half-wave plate 621 polarizes the first beam, composed of light pulses for synchronizing the transmission apparatus 620 with the reception apparatus, in a direction oriented at 90 degrees with respect to the second beam for the reception apparatus to perform homodyne detection of the first beam. The polarizing beam splitter 622 combines the first beam and the second beam, which are polarized in directions oriented at 90 degrees with respect to each other, on the same optical axis. The transmission apparatus 620 transmits, to the reception apparatus, the light obtained by combining the first beam and the second beam on the same optical axis.

According to the transmission apparatus 620, the reception apparatus that has received the light transmitted by the transmission apparatus 620 can perform homodyne detection of the first beam by using the second beam. In particular, the reception apparatus can be expected to be able to be synchronized with the transmission apparatus 620 by performing homodyne detection of the first beam by using the second beam, even in the case in which synchronization with the transmission apparatus 620 cannot be achieved by using just one of the first beam or the second beam.

Figure 15:
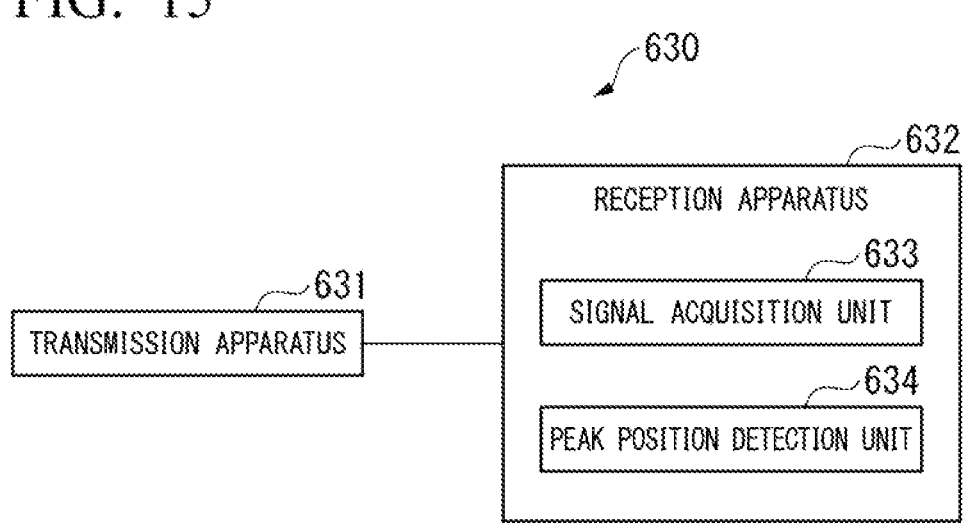
FIG. 15 is a diagram illustrating another example of the configuration of a quantum key distribution system according to an example embodiment.

FIG. 15 is a diagram illustrating one more example of the configuration of a quantum key distribution system according to an example embodiment. In the configuration illustrated in FIG. 15, the quantum key distribution system 630 includes a transmission apparatus 631 and a reception apparatus 632. The reception apparatus 632 includes a signal acquisition unit 633 and a peak position detection unit 634.

In this configuration, the signal acquisition unit 633 performs homodyne detection of the first beam transmitted from the transmission apparatus by using the second beam transmitted from the transmission apparatus and having an optical intensity higher than the first beam. The peak position detection unit 634 detects the peak positions at timings at which the amplitude of the signal obtained by homodyne detection has local maxima or local minima.

The signal acquisition unit 633 corresponds to an example of a signal acquiring means. The peak position detection unit 634 corresponds to an example of a peak position detecting means.

According to the quantum key distribution system 630, when synchronizing the transmission apparatus 631 with the reception apparatus 632 in order to perform continuous variable quantum key distribution, even in the case in which a sufficiently large amplitude for synchronizing the reception apparatus 632 cannot be obtained with the first beam used for transmission of the signal beam by the transmission apparatus 631, and the second beam that is used as the reference beam cannot be directly used for synchronization, light for the purpose of synchronization can be transmitted and received by using the configuration for quantum key distribution without the need to provide a separate configuration for transmitting and receiving light.

In particular, the signal acquisition unit 633 can obtain an optical amplification effect of weak light by making the signal beam interfere with a reference beam having strong optical power during homodyne detection, thereby allowing a signal with a relatively large amplitude to be detected, even in the case in which the intensity of the signal beam is low. By detecting the peak positions of the signal obtained by homodyne detection, the peak position detection unit 634 can detect the peak positions of a signal with a relatively large amplitude. Due to this feature, the peak position detection unit 634 can be expected to be able to detect the peak positions with relative accuracy.

Figure 16:
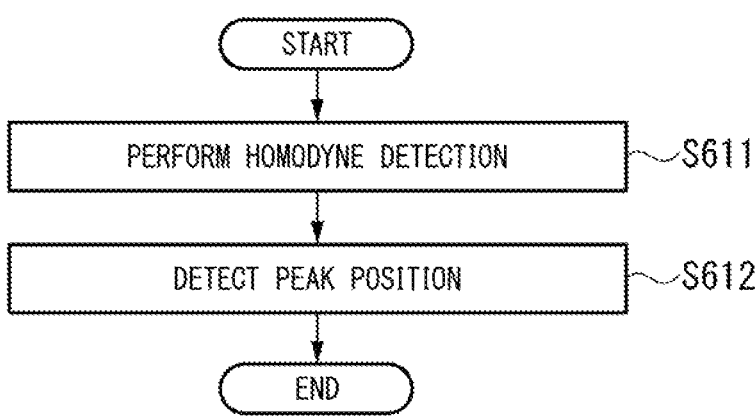
FIG. 16 is a diagram indicating an example of the processing procedure in a peak position detection method according to an example embodiment.

FIG. 16 is a diagram illustrating an example of the procedure for the processing in the peak position detection method according to an example embodiment. The peak position detection method indicated in FIG. 16 includes performing homodyne detection (step S611) and detecting a peak position (step S612).

When performing homodyne detection (step S611), the reception apparatus performs homodyne detection of the first beam transmitted from the transmission apparatus by using the second beam transmitted from the transmission apparatus and having an optical intensity higher than the first beam.

Detecting the peak position (step S612) involves the reception apparatus detecting a peak position, which is a timing at which there is a local maximum or a local minimum in the amplitude of the signal obtained by homodyne detection.

With the peak position detection method indicated in FIG. 16, when synchronizing the transmission apparatus with the reception apparatus in order to perform continuous variable quantum key distribution, even in the case in which a sufficiently large amplitude for synchronizing the reception apparatus cannot be obtained with the first beam used for transmission of the signal beam by the transmission apparatus, and the second beam that is used as the reference beam cannot be directly used for synchronization, light for the purpose of synchronization can be transmitted and received by using the configuration for quantum key distribution without the need to provide a separate configuration for transmitting and receiving light.

In particular, according to the peak position detection method indicated in FIG. 16, an optical amplification effect of weak light can be obtained by making the signal beam interfere with a reference beam with strong optical power during homodyne detection, thereby allowing a signal with a relatively large amplitude to be detected, even in the case in which the intensity of the signal beam is low. When detecting the peak position (step S612), by detecting a peak position in a signal obtained by homodyne detection, a peak position in a signal with a relatively large amplitude can be detected. Due to this feature, the peak position detection method indicated in FIG. 16 can be expected to be able to detect peak positions with relative accuracy.

Figure 17:
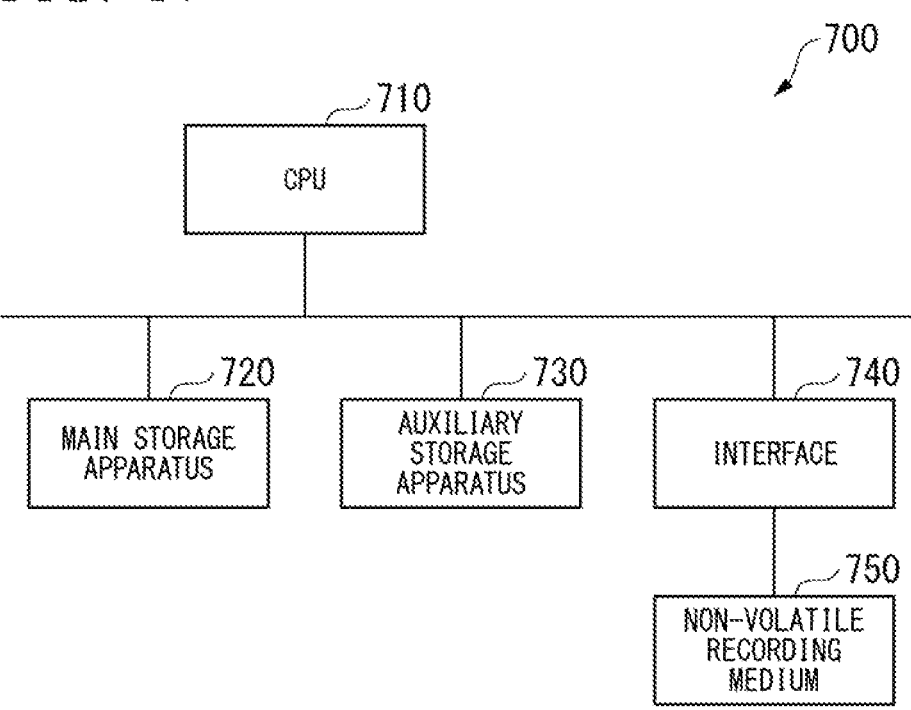
FIG. 17 is a schematic block diagram illustrating a configuration of a computer according to at least one example embodiment.

FIG. 17 is a schematic block diagram illustrating the configuration of a computer according to at least one example embodiment.

In the configuration illustrated in FIG. 17, the computer 700 includes a CPU 710, a main storage apparatus 720, an auxiliary storage apparatus 730, an interface 740, and a non-volatile recording medium 750.

Any one or more of, or a part of, the signal processing system in the reception apparatus 200, the peak position detection unit 612 in the reception apparatus 610, and the peak position detection unit 634 in the reception apparatus 632 described above may be installed on a computer 700. In that case, the operations of the respective processing units mentioned above are stored in the auxiliary storage apparatus 730 in the form of a program. The CPU 710 reads out the program from the auxiliary storage apparatus 730, loads the program in the main storage apparatus 720, and executes the above-mentioned processes in accordance with said program. Additionally, the CPU 710 secures, in the main storage apparatus 720, storage areas corresponding to the respective storage units mentioned above in accordance with the program. Communication between the respective apparatuses and other apparatuses is achieved by the interface 740 having a communication function and communicating in accordance with control by the CPU 710. Additionally, the interface 740 has a port for the non-volatile recording medium 750, reads out information from the non-volatile recording medium 750, and writes information into the non-volatile storage medium 750.

In the case in which the signal processing system of the reception apparatus 200 is installed on the computer 700, the operations of the analog/digital converter 208, the absolute value acquisition unit 210, the peak position detection unit 211, and the amplitude determination unit 212 are stored in the auxiliary storage apparatus 730 in the form of programs. The CPU 710 reads out the programs from the auxiliary storage apparatus 730, loads the programs in the main storage apparatus 720, and executes the above-mentioned processes in accordance with said programs.

Additionally, the CPU 710 secures, in the main storage apparatus 720, storage areas for the signal storage unit 209 and the timing storage unit 213 in accordance with the programs.

In the case in which the peak position detection unit 612 of the reception apparatus 610 is installed on the computer 700, the operations of the peak position detection unit 612 are stored in the auxiliary storage apparatus 730 in the form of programs. The CPU 710 reads out the programs from the auxiliary storage apparatus 730, loads the programs in the main storage apparatus 720, and executes the above-mentioned processes in accordance with said programs.

Additionally, the CPU 710 secures, in the main storage apparatus 720, storage areas for the peak position detection unit 612 to perform the processes in accordance with the programs.

In the case in which the peak position detection unit 634 of the reception apparatus 632 is installed on the computer 700, the operations of the peak position detection unit 634 are stored in the auxiliary storage apparatus 730 in the form of programs. The CPU 710 reads out the programs from the auxiliary storage apparatus 730, loads the programs in the main storage apparatus 720, and executes the above-mentioned processes in accordance with said programs.

Additionally, the CPU 710 secures, in the main storage apparatus 720, storage areas for the peak position detection unit 634 to perform the processes in accordance with the programs.

Any one or more of the programs mentioned above may be recorded on the non-volatile recording medium 750. In this case, the interface 740 may read out the programs from the non-volatile recording medium 750. Furthermore, the CPU 710 may directly execute the programs read out by the interface 740 or may execute the programs after temporarily storing the programs in the main storage apparatus 720 or the auxiliary storage apparatus 730.

Programs for executing all or some of the processes performed by the signal processing system in the reception apparatus 200, the peak position detection unit 612 in the reception apparatus 610, and the peak position detection unit 634 in the reception apparatus 632 may be recorded on a computer-readable recording medium, and the programs recorded on this recording medium may be read into a computer system and executed in order to perform the processes of each unit. The "computer system" mentioned here includes an OS (operating system) and hardware such as peripheral devices.

Additionally, the "computer-readable recording medium" refers to a portable medium such as a flexible disk, a magneto-optic disk, a read-only memory (ROM), or a compact disc read-only memory (CD-ROM), or to a storage apparatus, such as a hard disk, inside a computer system. Additionally, the above-mentioned programs may be for realizing just some of the aforementioned functions, and may further be able to realize the aforementioned functions by being combined with a program already recorded in a computer system.

While example embodiments of the present disclosure have been described in detail with reference to the drawings above, the specific configurations are not limited to these example embodiments, and designs, etc. within a range not departing from the spirit of this disclosure are also included.

While preferred example embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

While the disclosure has been particularly shown and described with reference to example embodiments thereof, the disclosure is not limited to these embodiments. It will be understood by those of ordinary skill in the art that various changes in form and details may be made therein without departing from the spirit and scope of the present disclosure as defined by the claims.

Some or all of the example embodiments described above may be described by, but are not limited to, the appendices below.

(Supplementary Note 1)

A reception apparatus comprising:

signal acquiring means for performing homodyne detection of a first beam transmitted from a transmission apparatus by using a second beam transmitted from the transmission apparatus and having an optical intensity higher than the first beam; and peak position detecting means for detecting a peak position, which is a timing at which there is a local maximum or a local minimum in an amplitude of a signal obtained by the homodyne detection.

(Supplementary Note 2)

The reception apparatus according to Supplementary Note 1, further comprising absolute value acquiring means for taking an absolute value of the amplitude of the signal obtained by homodyne detection, wherein the peak position detecting means detects, as the peak position, a timing at which there is a local maximum in the amplitude of the signal that is the absolute value of the amplitude of the signal obtained by the homodyne detection.

(Supplementary Note 3)

The reception apparatus according to Supplementary Note 1 or Supplementary Note 2, comprising:

an amplitude determining means for determining whether or not a magnitude of the amplitude at the peak position detected by the peak position detecting means is greater than a predetermined threshold value; and timing storage means for storing the peak position when the amplitude determining means has determined that the magnitude of the amplitude at the peak position is greater than the predetermined threshold value;

wherein, when the amplitude determining means has determined that the magnitude of the amplitude at the peak position is equal to or lower than the predetermined threshold value, homodyne detection of the first beam by the signal acquiring means, detection of the peak position by the peak position detecting means, and determination of whether or not the magnitude of the amplitude at the peak position is greater than the predetermined threshold value by the amplitude determining means are repeated.

(Supplementary Note 4)

A transmission apparatus comprising:

a half-wave plate that polarizes a first beam, composed of light pulses for synchronizing the transmission apparatus with a reception apparatus, in a direction oriented at 90 degrees with respect to a second beam for homodyne detection of the first beam by the reception apparatus; and a polarizing beam splitter that combines, on the same optical axis, the first beam and the second beam, which are polarized in directions oriented at 90 degrees with respect to each other;

wherein the transmission apparatus transmits light combining the first beam and the second beam on the same optical axis to the reception apparatus.

(Supplementary Note 5)

A quantum key distribution system comprising a transmission apparatus and a reception apparatus, wherein:

the transmission apparatus transmits a first beam for synchronizing the transmission apparatus with the reception apparatus, and a second beam having an optical intensity higher than the first beam; and the reception apparatus comprises signal acquiring means for performing homodyne detection of the first beam by using the second beam, and peak position detecting means for detecting a peak position, which is a timing at which there is a local maximum or a local minimum in an amplitude of a signal obtained by the homodyne detection.

(Supplementary Note 6)

A peak position detection method including steps of a reception apparatus:

performing homodyne detection of a first beam transmitted from a transmission apparatus by using a second beam transmitted from the transmission apparatus and having an optical intensity higher than the first beam; and detecting a peak position, which is a timing at which there is a local maximum or a local minimum in an amplitude of a signal obtained by the homodyne detection.

(Supplementary Note 7)

A program for making a computer that controls a reception apparatus execute a step of:

detecting a peak position, which is a timing at which there is a local maximum or a local minimum in an amplitude of a signal obtained by homodyne detection of a first beam transmitted from a transmission apparatus by using a second beam transmitted from the transmission apparatus and having an optical intensity higher than the first beam.

What is claimed is:

1. A reception apparatus comprising:

at least one memory configured to store instructions; and at least one processor configured to execute the instructions to:

cause the reception apparatus to receive a first beam and a second beam transmitted from a transmission apparatus, wherein the first beam is not modulated, and the first beam and the second beam are 90 degrees orthogonal to each other;

perform homodyne detection of the first beam transmitted from the transmission apparatus by using the second beam transmitted from the transmission apparatus and having an optical intensity higher than the first beam; and detect a peak position, which is a timing at which there is a local maximum or a local minimum in an amplitude of a signal obtained by the homodyne detection; and synchronize the transmission apparatus and the reception apparatus.

2. The reception apparatus according to claim 1, wherein the at least one processor is further configured to execute the instructions to:

take an absolute value of the amplitude of the signal obtained by the homodyne detection; and detect, as the peak position, a timing at which there is a local maximum in the amplitude of the signal that is the absolute value of the amplitude of the signal obtained by the homodyne detection.

3. The reception apparatus according to claim 1, wherein the at least one processor is further configured to execute the instructions to:

determine whether or not a magnitude of the amplitude at the detected peak position is greater than a predetermined threshold value; and store the peak position when it is determined that the magnitude of the amplitude at the peak position is greater than the predetermined threshold value;

wherein, when it is determined that the magnitude of the amplitude at the peak position is equal to or lower than the predetermined threshold value, homodyne detection of the first beam, detection of the peak position, and determination of whether or not the magnitude of the amplitude at the peak position is greater than the predetermined threshold value are repeated.

4. The reception apparatus according to claim 2, wherein the at least one processor is further configured to execute the instructions to:

determine whether or not a magnitude of the amplitude at the detected peak position is greater than a predetermined threshold value; and store the peak position when it is determined that the magnitude of the amplitude at the peak position is greater than the predetermined threshold value;

wherein, when it is determined that the magnitude of the amplitude at the peak position is equal to or lower than the predetermined threshold value, homodyne detection of the first beam, detection of the peak position, and determination of whether or not the magnitude of the amplitude at the peak position is greater than the predetermined threshold value are repeated.

5. A transmission apparatus comprising:

a half-wave plate configured to polarize a first beam including light pulses for synchronizing the transmission apparatus with a reception apparatus, in a direction oriented at 90 degrees with respect to a second beam for homodyne detection of the first beam by the reception apparatus; and a polarizing beam splitter configured to combine, on the same optical axis, the first beam and the second beam, which are polarized in directions oriented at 90 degrees with respect to each other;

wherein the transmission apparatus is configured to transmit light combining the first beam and the second beam on the same optical axis to the reception apparatus to synchronize the transmission apparatus and the reception apparatus, and wherein the first beam is not modulated.

6. A quantum key distribution system comprising the transmission apparatus and the reception apparatus according to claim 1, wherein:

the transmission apparatus is configured to transmit the first beam for synchronizing the transmission apparatus with the reception apparatus, and the second beam having an optical intensity higher than the first beam.

7. A peak position detection method comprising:

receiving a first beam and a second beam transmitted from a transmission apparatus, wherein the first beam is not modulated, and the first beam and the second beam are 90 degrees orthogonal to each other;

performing homodyne detection of the first beam transmitted from the transmission apparatus by using the second beam transmitted from the transmission apparatus and having an optical intensity higher than the first beam; and detecting a peak position, which is a timing at which there is a local maximum or a local minimum in an amplitude of a signal obtained by the homodyne detection; and synchronizing the transmission apparatus and a reception apparatus.

* * * * *